Nov. 29, 1938. M. TATOSIAN 2,138,247
PIE DIE
Filed March 12, 1935
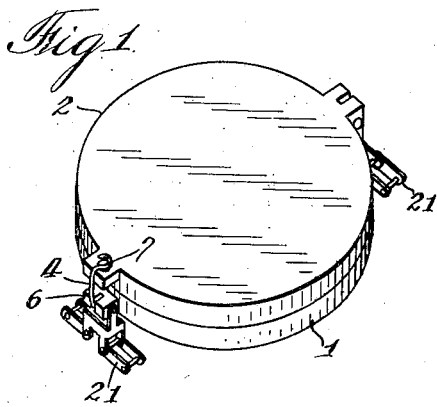
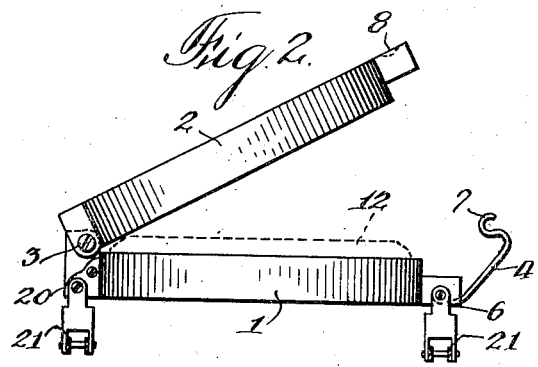
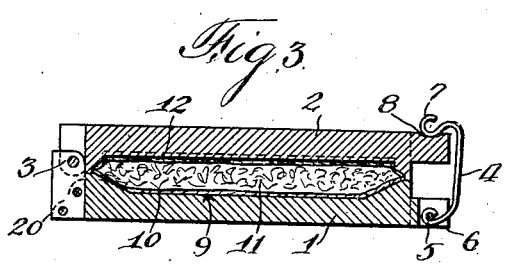
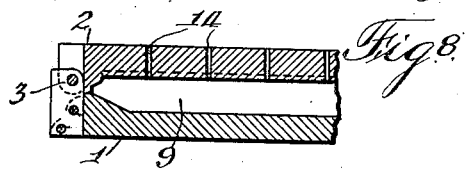
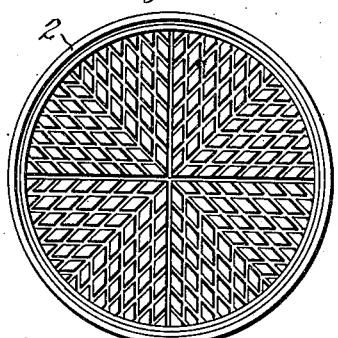
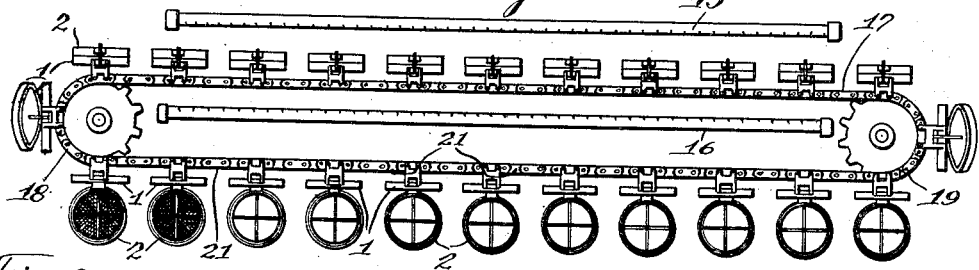
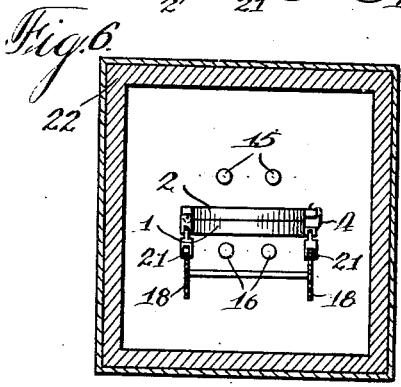
Inventor
Martin Tatosian
By Jones, Addington, Ames & Seibold
Attys.

Patented Nov. 29, 1938

2,138,247

UNITED STATES PATENT OFFICE 2,138,247

PIE DIE

Martin Tatosian, Chicago, Ill.

Application March 12, 1935, Serial No. 10,680

2 Claims. (Cl. 107—58)

My invention relates to a mould or die for baking victuals, such as pies or the like, and more particularly to improved apparatus of this type capable of producing a more edible product.

Containers or vessels for pie ingredients are usually flat pans or tins having an open top. It is customary to spread the dough for the lower part of the pie in these pans, then insert the filling, and finally, spread a top layer of dough, if one is to be used, as a cover over the filling. The pans are inserted into a hot air oven, usually having the burners disposed below so that the heat may be circulated by currents of air travelling upwardly to the top. The heating action results from the hot air coming into contact with the bottom of the pans and also striking the exposed top of the pies. Inasmuch as the travel of the hot air is upwardly through the oven, the bottom of the pans are generally subjected to greater heat. However, the baking may or may not be at a greater rate from the bottom of the pies in these pans, it depending somewhat upon the construction of the oven and the means employed, if any, to deflect the rising hot air about the interior of the oven. It has been found in the art of baking that if the temperature of the oven is too great when the pies are inserted, a crust appearing as a dry skin is apt to form over the surface of the top layer of the pies, whether this top layer be dough or a filling. The crust or dry surface skin tends to retard proper uniform evaporation which takes place during the baking action and also tends to retard a uniform conduction of heat to the interior of the pies with the result that the heat is unevenly conducted to the interior from both sides of the pies.

Moreover, improper heat control of the oven often results in the burning of the top of the pies. Covers have been heretofore used that would lightly rest upon the rim of the pans, these covers being spaced or raised out of contact with the pies so as merely to retard excessive heating at the top. I have found, however, that too much heat is retarded by these spaced covers and the pies are unevenly baked.

It is an object of my invention, therefore, to provide an improved type of mould or die for the baking of pies that will conduct the heat uniformly inwardly toward the center from both sides, so that the pies will be evenly baked throughout and the burning of the top of the pies obviated.

It is a further object of my invention to provide an improved type of pie mould or die of this type having two parts connected together, say by hinging, and provided with an inner cored portion to receive the pie ingredients, these parts preferably being substantially of uniform thickness, when found necessary, and engaging directly against the bottom and top of the pies when they are closed so as to transmit the heat uniformly inwardly from these two parts, whereby to effect even and uniform baking of the pies.

A specific advantage of my improved pie mould or die is the possible use of burners above and below the mould or die that may direct the heat from the flame directly against both parts of the mould or die. This arrangement obviates, therefore, any tendency of uneven conduction of heat resulting in either too much heat being applied against the pans or too much heated air circulating against the top of the pies to form an undesirable burned crust.

I find that my invention very desirably permits accurate control of the moisture content of the finished pies. Baking of the pies in my improved moulds or dies allows a retention of substantially the original moisture content of the ingredients and a finished product wherein the moisture loss is only that which occurs after baking by normal exposure to the atmosphere until consumed. Accordingly, a very desirable and palatable product may be obtained.

Moreover, my invention advantageously permits commercial baking of pies upon a production basis at exceptionally low cost. The moulds or dies may be secured to endless conveyors, or their equivalent, and caused to travel between rows of top and bottom burners, furnishing a predetermined heat during a predetermined time travel of the conveyor, whereby completely to bake the pies in adequate but minimum time.

A further advantage of my invention resides in producing by the apparatus disclosed a uniformly thick product having a consequently improved appearance over pies heretofore produced. It is impossible in the baking of these pies to secure any deformity in the product resulting from uneven application of heat or uneven baking. Moreover, retaining in the final product substantially the entire moisture of the ingredients allows the pies to remain fresh over a longer period before drying out beyond the point of edibility.

Further objects and advantages of the invention will be apparent from the following description when taken in connection with the accompanying drawing forming a part hereof.

In the drawing:

Figure 1 is a perspective view of a pie mould or die embodying the invention.

Fig. 2 is a side elevational view of the pie mould or die illustrating the parts unlocked and the cover or lid in raised position.

Fig. 3 is a transverse sectional view of the pie mould or die.

Fig. 4 is a face view of the inside surface of the cover or lid to illustrate the manner of providing a pattern or design for the top surface of the pie.

Fig. 5 illustrates the manner of employing a series of these pie dies in a commercial installation.

Fig. 6 illustrates an oven with the apparatus shown in Fig. 5 installed therein.

Fig. 7 is a side elevational view with the parts of the pie mould or die closed and illustrating the use of this device as a single unit, and Fig. 8 is a fragmentary detail sectional view of an alternative form of pie mould.

Referring more particularly to Figures 1 to 3, inclusive, of the drawing, a pie mould or die embodying the present invention comprises parts 1 and 2. Part 1 may be a base member into which the ingredients are placed and part 2 may be a cover or lid that is tightly closed upon part 1. These parts are hinged together at 3 in any suitable mechanical way and have a locking member 4 arranged diametrically opposite this hinge. Any suitable form of locking member 4 may be employed, but, as illustrated herein, a spring member is secured about a pin 5 carried by a bifurcated lug 6 on base part 1. The spring locking member 4 may then extend upwardly and be curled at its free end 7 for the purpose of engaging a groove 8 in the face of the cover part 2 by a snap action.

Each inner face of parts 1 and 2 is cored away to form a pocket 9 to receive the pie ingredients. By providing base 1 and cover 2 substantially of uniform thickness, heat will be conducted evenly through them to pocket 9, whereby both sides of the pie are subjected to the same temperature and baking action. The lower layer of the dough forming the bottom of the finished pie illustrated at 10 in Fig. 3 is first laid over the inner surface of base 1. Filling 11 is then inserted and evenly spread over the layer of dough 10. If a cover is to be used in the making of the pie, a top layer of dough 12 is laid over filling 11. Cover 2 is then closed and locked to base 1 by member 4. The arrangement brings both inner faces of parts 1 and 2 against opposite sides of the pie, thereby leaving no air space above the pie so that heat may be conducted to every portion of the pie at a uniform rate, assuming, of course, that these parts will be made substantially of uniform thickness. If these parts are not of uniform thickness, materials having relative heat conduction coefficients that compensate for the different thicknesses may be used.

The closed pie pocket 9 in the mould or die shown preferably prevents loss of moisture of the ingredients during baking. It will be understood, however, that the general principles of my invention employing a closed pie mould or die of two parts that are substantially of uniform thickness may be employed in a construction using means for allowing an escape of a certain portion of the moisture of the ingredients during the baking. This structure is illustrated in Fig. 8, and the means shown for the purpose of illustration comprise any number of openings 14 located either in cover 2, or, if found desirable, in base 1.

By bringing cover 2 against the top dough cover of the pie and holding it thereagainst during the baking allows predetermining the face design of the pie. Fig. 4 illustrates a pattern or design employed on the inside face of cover 2. The pattern may be of a chosen selection which is either confined to the design of the top face of the pie solely or, in addition, leaving markings indicating uniform segments into which the pie may be cut.

I have found that the use of my improved pie mould or die allows the application of heat against both sides thereof so as to secure the desirable uniform application of heat and baking from both sides. Accordingly, the disadvantages of baking pies in open pans or tins, as heretofore proposed, are eliminated.

In Fig. 5, upper and lower rows of burners 15 and 16 are shown in spaced relation to permit a conveyor 17 to travel therebetween. A plurality of pie moulds or dies may be secured to conveyor 17 in any suitable way whereby, as conveyor 17 travels between burners 15 and 16 and around end rollers 18 and 19, the individual moulds or dies may be filled as they travel about the forward roller 18, then locked manually or automatically and brought into and through the baking zone at a predetermined rate of travel so that when they emerge at the opposite end the pies will be uniformly baked in adequate but minimum time.

Base part 1 may be provided with a lug 20 diametrically opposite lug 6. Both lugs 6 and 20 may be secured to links 21, as illustrated in Fig. 2, forming part of the conveyor 17. The manner of attaching each pie mould or die to the conveyor 17 and the construction of the conveyor 17 itself may be widely varied without departing from the invention.

The apparatus shown in Fig. 5 may be enclosed in an oven 22 of any suitable construction. It will be understood that the requirements of an individual installation will control the manner in which the apparatus shown in Fig. 5 is embodied in oven 22, and also control the construction of this oven.

If the pie mould or die is used as a single unit for domestic purposes, a handle 24 may be attached to either of the parts 1 or 2, but, as I have illustrated in Fig. 7, handle 24 may be attached to the cover 2.

From the foregoing description it will be apparent to those skilled in the art that my invention aims to produce a pie mould or die producing a baked pie of higher quality than that obtained heretofore. The heat may be uniformly transmitted to both sides of the pie during its baking so that it will be evenly baked throughout and have bottom and top crusts of substantially the same thickness. The pie will have a more pleasing appearance because it will be of uniform thickness and not have any undesirable swelling that causes one portion of the pie to be thicker or not properly baked.

Without further elaboration, the foregoing will so fully explain the gist of my invention that others may, by applying current knowledge, readily adopt the same for use under varying conditions of service, without eliminating certain features, which may properly be said to constitute the essential items of novelty involved, which items are intended to be defined and secured to me by the following claims.

I claim:

1. A device for baking pies on a conveyor travelling through an oven in a manner to retain substantially the original moisture content comprising a pie holder on said conveyor, said holder comprising a base secured to said conveyor, a hinged cover on said base, said base and said cover forming a chamber therebetween to receive the ingredients of a pie to be baked therein and formed to seal the edges of the dough layers, said base and said cover being comparatively very thick metal plates of substantially uniform thickness and having high heat-retaining characteristics to provide uniform heat conduction to every portion of the pie at a uniform rate, means to lock said cover to substantially seal said chamber against the escape of moisture from the edges of the pie therein, said cover having perforations therein remote from the edges to permit escape of a portion of the moisture.

2. In a device for baking pies on a conveyor travelling in an elongated oven in a manner to retain substantially the original moisture content, said pies comprising the usual upper and lower thin layers of dough sealed at the edges and having a relatively thick filling therebetween, comprising a pie holder forming a flight on said conveyor, said holder comprising a base secured to said conveyor, a hinged cover on said base, said base and said cover forming a chamber therebetween to receive the ingredients of a pie to be baked therein and formed to seal the edges of said dough layers, said base and said cover being comparatively very thick metal plates of substantially uniform thickness and having high heat-retaining characteristics to provide uniform heat conduction to every portion of the pie at a uniform rate, means to lock said cover to substantially seal said chamber against the escape of moisture, whereby the heat in said oven is uniformly directed to the surface of the pie.

MARTIN TATOSIAN.